US010870119B2

(12) United States Patent
Asensio Caño et al.

(10) Patent No.: US 10,870,119 B2
(45) Date of Patent: Dec. 22, 2020

(54) APPARATUS AND A METHOD FOR GENERATING DROPLETS

(71) Applicants: Ingeniatrics Tecnologias, Camas (Seville) (ES); Universidad de Sevilla, Seville (ES)

(72) Inventors: Miguel Angel Asensio Caño, Seville (ES); Beatriz Talavera Almena, Seville (ES); María Flores Mosquera, Seville (ES); Alfonso Miguel Gañán-Calvo, Seville (ES)

(73) Assignees: Ingeniatrics Tecnologías, Camas (ES); Universidad de Sevilla, Seville (ES)

( * ) Notice: Subject to any disclaimer, the term of this patent is extended or adjusted under 35 U.S.C. 154(b) by 290 days.

(21) Appl. No.: 15/551,893

(22) PCT Filed: Feb. 22, 2016

(86) PCT No.: PCT/EP2016/053643
§ 371 (c)(1),
(2) Date: Aug. 17, 2017

(87) PCT Pub. No.: WO2016/131983
PCT Pub. Date: Aug. 25, 2016

(65) Prior Publication Data

US 2018/0029055 A1 Feb. 1, 2018

(30) Foreign Application Priority Data

Feb. 20, 2015 (EP) .................................... 15382069

(51) Int. Cl.
*B05B 7/06* (2006.01)
*B29C 48/885* (2019.01)
(Continued)

(52) U.S. Cl.
CPC ................ *B05B 7/066* (2013.01); *B01D 1/18* (2013.01); *B01J 2/04* (2013.01); *B01J 2/06* (2013.01);
(Continued)

(58) Field of Classification Search
CPC ...................................................... B05B 7/066
See application file for complete search history.

(56) References Cited

U.S. PATENT DOCUMENTS 5,868,322 A * 2/1999 Loucks, Jr. ........... B05B 5/0255 239/418
6,012,647 A * 1/2000 Ruta ....................... B05B 7/066 239/132.1
(Continued)

FOREIGN PATENT DOCUMENTS

DE 2148051 A1 4/1973
DE 19927537 A1 12/2000
(Continued)

OTHER PUBLICATIONS

Machine translation of DE-202007008121-U1, Nov. 19, 2019 (Year: 2019).*
(Continued)

*Primary Examiner* — Benjamin A Schiffman
(74) *Attorney, Agent, or Firm* — BakerHostetler

(57) ABSTRACT

An apparatus is described. The apparatus comprises a liquid dispenser comprising a liquid outlet, the liquid dispenser being configured to generate a droplet stream. The apparatus also comprises a first fluid flow device configured to generate a confinement fluid flow for confining a trajectory of the droplet stream therein, the first fluid flow device comprising an outlet arranged to allow the droplet stream to exit therefrom, wherein the fluid outlet is arranged within the confinement fluid flow device. Furthermore, the apparatus
(Continued)

comprises a second fluid flow device configured to generate a reaction fluid flow for reacting with droplets in the droplet stream, wherein the outlet of the first fluid flow device is arranged within the second fluid flow device. A method is also described.

18 Claims, 10 Drawing Sheets

(51) Int. Cl.

| | |
|---|---|
| ***D01D 5/14*** | (2006.01) |
| ***B05B 12/18*** | (2018.01) |
| ***B01D 1/18*** | (2006.01) |
| ***B01J 2/06*** | (2006.01) |
| ***F26B 3/12*** | (2006.01) |
| ***B01J 2/04*** | (2006.01) |

(52) U.S. Cl.

CPC ............ *B05B 12/18* (2018.02); *B29C 48/885* (2019.02); *D01D 5/14* (2013.01); *F26B 3/12* (2013.01)

(56) References Cited

U.S. PATENT DOCUMENTS

| | | | | | |
|---|---|---|---|---|---|
| 6,248,378 | B1 * | 6/2001 | Ganan-Calvo | A61K 9/1694 | 424/439 |
| 6,386,463 | B1 * | 5/2002 | Ganan-Calvo | A61M 15/0065 | 123/585 |
| 6,595,202 | B2 * | 7/2003 | Ganan-Calvo | B05B 7/0884 | 128/200.14 |
| 6,792,940 | B2 * | 9/2004 | Ganan-Calvo | A61M 15/0065 | 128/200.14 |
| 9,120,109 | B2 * | 9/2015 | Ganan-Calvo | B05B 7/0475 | |
| 9,782,733 | B2 * | 10/2017 | van Hoeve | B01J 19/0093 | |
| 9,789,451 | B2 * | 10/2017 | Ripoll | B01F 3/0807 | |
| 2009/0230218 | A1 * | 9/2009 | Drozd | B05B 7/066 | 239/526 |

FOREIGN PATENT DOCUMENTS

| | | | | |
|---|---|---|---|---|
| DE | 202007008121 | U1 * | 9/2007 | A23L 3/46 |
| DE | 202007008121 | U1 | 9/2007 | |
| EP | 0387950 | A1 | 9/1990 | |
| FR | 2080016 | A5 | 11/1971 | |
| NL | 8602952 | A | 6/1988 | |

OTHER PUBLICATIONS

European Patent Application No. 15382069.1; Extended Search Report; dated Aug. 6, 2015; 9 pages.

International Patent Application No. PCT/EP2016/053643; Int'l Written Opinion and Search Report; dated May 18, 2016; 12 pages.

* cited by examiner

APPARATUS AND A METHOD FOR GENERATING DROPLETS

CROSS-REFERENCE TO RELATED APPLICATIONS

This is a national stage application in the United States based on International Application No. PCT/EP2016/053643, filed Feb. 22, 2016, which claims priority to European Patent Application No. 15382069.1, filed Feb. 20, 2015, the contents of each of which are incorporated herein by reference in their entirety.

The invention relates to an apparatus and methods for generating droplets. The present disclosure relates to a method of generating a collimated stream of droplets from a flow focusing nozzle, and a method and an apparatus for preserving droplets when immersed (i.e. introduced) in to a drying or hardening environment and/or for protecting droplets during formation.

Techniques are known for producing collimated droplet streams, such as flow focusing. The droplets in the droplet streams may be subsequently dried to form a powder, for example, which is often referred to as spray drying. However, the number of droplets that are capable of being dried compared to the number of droplets that are produced is often low (e.g., below 80%), due to the droplets being attracted, and/or adhering, to the apparatus. Moreover, as the droplets exit from a droplet forming device, the initial properties/characteristics of the droplets may be lost or affected such that the droplet loses its form and may become agglomerated and/or polydispersed, or may not even be produced.

FIG. 1 illustrates an example of a known system 1 that is used for spray drying. The system 1 includes a droplet forming device 2, such as a flow focusing nozzle. The illustrated example has been simplified, but it will be appreciated that the flow focusing nozzle is fed with one or more fluids 4 to produce a droplet stream at its outlet (not shown). The outlet of the device 2 is within a drying chamber, which is in this background example is an elongate cylindrical conduit 6. The conduit 6 is provided with an air stream via fluid inlet 8. The air stream is at a temperature greater than room temperature (i.e., 20° C. to 26° C.) such that as the droplet stream exits the device 2, the droplets are air dried. However, the air stream provided within the conduit 6 may prevent droplets being effectively produced or, as is mentioned above, may affect the droplets such that they become agglomerated and/or polydispersed.

Accordingly, it is an object of the present invention to improve the yield of droplets and/or powder produced by such spray drying apparatus, and to provide a stabilization environment for droplets exiting a droplet forming device before being air dried.

The present disclosure can be understood with reference to the description of the embodiments set out below, in conjunction with the appended drawings in which.

Figure 1:
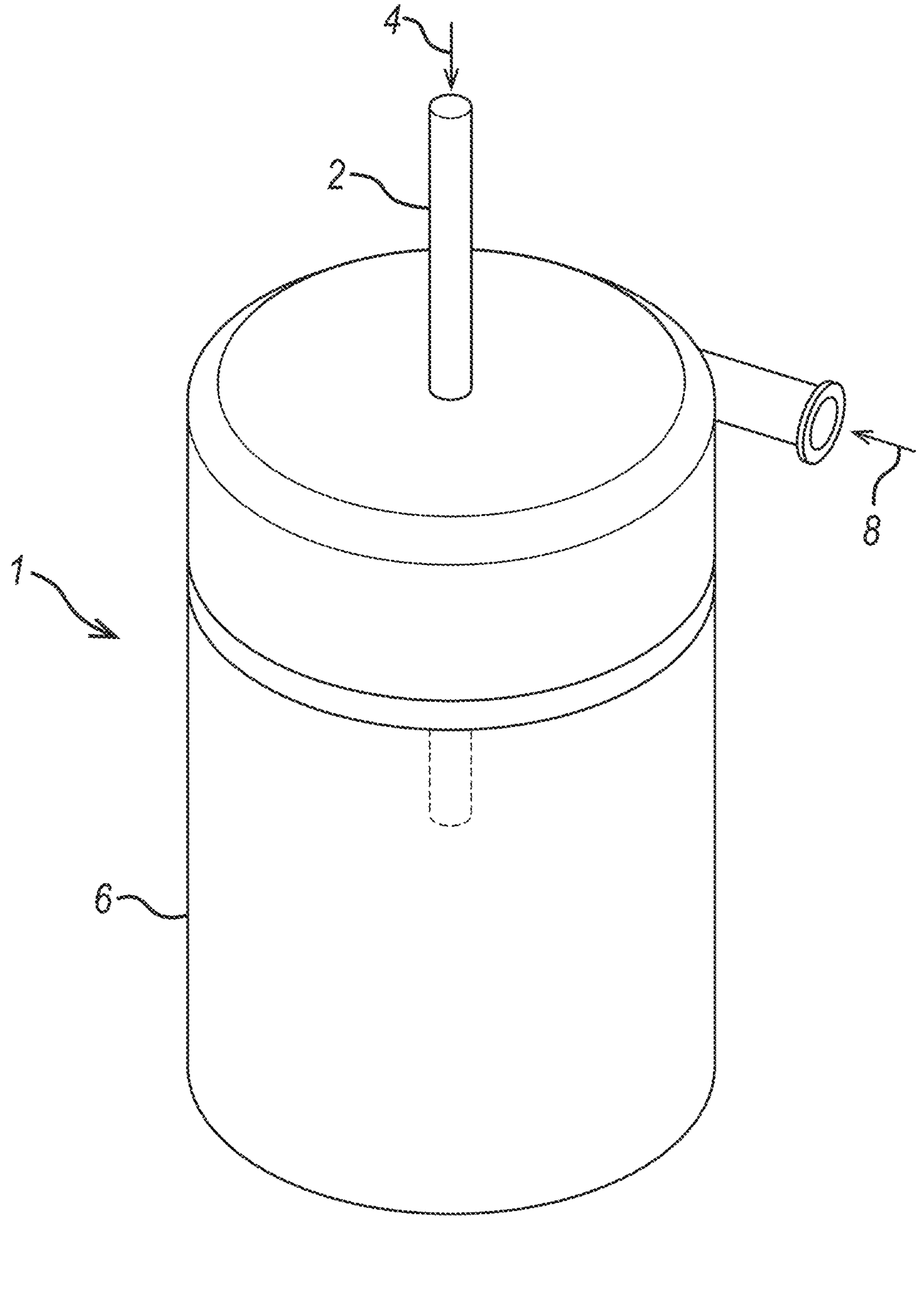
FIG. 1 illustrates schematically an example of a known air drying system.

According to a first aspect of the invention there is provided an apparatus comprising: a liquid dispenser comprising a liquid outlet, the liquid dispenser being configured to generate a droplet stream; a first fluid flow device configured to generate a confinement fluid flow for confining a trajectory of the droplet stream therein, the first fluid flow device comprising an outlet arranged to allow the droplet stream to exit therefrom, wherein the fluid outlet is arranged within the confinement fluid flow device; and a second fluid flow device configured to generate a reaction fluid flow for reacting with droplets in the droplet stream, wherein the outlet of the first fluid flow device is arranged within the second fluid flow device. Thus, the droplets during formation are protected from the reaction fluid flow and a greater number of the droplets produced using the liquid dispenser may be persevered. Accordingly, at least 99.5% of the droplets that are produced will exit the first fluid flow device and can be subsequently transformed to form particles.

The liquid dispenser is configured to generate the droplet stream using flow focusing.

The liquid dispenser may be concentrically arranged within the first fluid flow device (i.e., the liquid dispenser and the first fluid flow device may share the same centre or axis, such that they are coaxial) and the first fluid flow device may be concentrically arranged within the second fluid flow device.

Each of the confinement fluid and/or the reaction fluid may be air.

The first and/or second fluid flow devices may comprise an elongate conduit and the first and/or second fluid flow devices may comprise a circular conduit (i.e., the conduit has a circular cross section). The conduits may also be non-circular (e.g. oval, elliptical or simple polygon). It will be understood that if a non-circular conduit is used its radius is taken to be half the largest distance between any pair of vertices.

The liquid outlet may comprise a plurality of nozzles, each configured to generate a droplet stream.

The temperature of the second fluid flow may be greater than the temperature of the droplet stream and/or the confinement fluid flow.

The reaction may comprise hardening the droplets in the droplet stream.

The first fluid flow device may be dimensioned to produce a laminar fluid flow, and may be dimensioned to prevent the droplet stream from being agglomerated.

According to a second aspect of the invention there is provided a system comprising an apparatus according to any one of the above-described apparatus and a first fluid flow generating device coupled to the first fluid flow device and configured to provide the confinement fluid to the first fluid flow device. The first fluid flow generating device and the first fluid flow device may be configured according to the following expression:

$$U_{min} \geq 0.2 \cdot \left( \frac{\mu_g^2 H^3}{\rho_g^2 D_1^5} \right)^{1/2}$$

where: $U_{min}$ is the velocity of the flow rate of the confinement fluid; $\mu_g$ is the viscosity of the confinement fluid; H is the distance between the liquid outlet of the liquid dispenser and the outlet of the first fluid flow device; $\rho_g$ is the density of the confinement fluid; and $D_1$ is the external diameter of the liquid dispenser.

According to a third aspect of the invention there is provided a method comprising: generating a droplet stream from a liquid dispenser; generating a confinement fluid flow within a first fluid flow device to confine the trajectory of the droplet stream, wherein the droplet stream is generated within the confinement fluid flow and exits from an outlet of the first fluid flow device; and generating a reaction fluid flow within a second fluid flow device for reacting with droplets in the droplet stream, wherein the confinement fluid flow is generated within the reaction fluid flow.

The reaction fluid flow may harden the droplets to form particles/capsules and the method may comprise collecting the particles/capsules at an outlet of the second fluid flow device.

A minimum velocity of the confinement fluid flow is represented by the expression:

$$U_{min} \geq 0.2 \cdot \left( \frac{\mu_g^2 H^3}{\rho_g^2 D_1^5} \right)^{1/2}$$

where: $U_{min}$ is the velocity of the flow rate of the confinement fluid; $\mu_g$ is the viscosity of the confinement fluid; H is the distance between the liquid outlet of the liquid dispenser and the outlet of the first fluid flow device; $\rho_g$ is the density of the confinement fluid; and $D_1$ is the external diameter of the liquid dispenser.

According to a fourth aspect of the invention there is provided a method of generating a collimated stream of droplets from a flow focusing nozzle comprising a discharge orifice, a first fluid dispenser and a second fluid dispenser, wherein the second fluid dispenser is arranged to accelerate, with a carrier fluid, a fluid being dispensed from the first fluid dispenser out of the discharge nozzle, the method comprising configuring the flow focusing nozzle to obtain a geometric standard deviation of the disbursement of droplets from the collimated stream of droplets of less than 1.6 according to the expression:

$$\left( \frac{D^2 \Delta P^2 \rho_l^2 Q_l}{\sigma \mu_l^3} \right)^{1/4} \leq \frac{1 + 0.5\left(\frac{\rho_l}{\rho_d}\right)}{1 + 0.018\left(\frac{\mu_l}{\mu_d}\right)}$$

where D is the nominal diameter of the discharge orifice, $\Delta P$ is the pressure of the carrier, $\rho_1$ is the density of the fluid being dispensed, $Q_l$ is the flow rate of the fluid being dispensed from the first fluid dispenser, $\sigma$ is the surface tension between the fluid being dispensed and the carrier fluid, $\mu_l$ is the viscosity of the fluid being dispensed, $\rho_d$ is the density of the carrier fluid, and $\mu_d$ is the viscosity of the carrier fluid.

The flow focusing nozzle may be configured to obtain a geometric standard deviation of the disbursement of droplets from the collimated stream of droplets of less than 1.4, or less than 1.3.

The first fluid dispenser may comprise an inner fluid dispenser configured to dispense a core fluid and an outer fluid dispenser configured to dispense a shell fluid and wherein $\rho_l$, $Q_l$, and $\mu_l$ are of the shell fluid.

According to a fifth aspect of the invention there is provided a particle manufactured according to any one of the above-described methods.

According to a sixth aspect of the invention there is provided a method for designing an apparatus comprising: providing a liquid dispenser comprising a liquid outlet, the liquid dispenser being configured to generate a droplet stream; providing a first fluid flow device configured to generate a confinement fluid flow for confining a trajectory of the droplet stream therein, the first fluid flow device comprising an outlet arranged to allow the droplet stream to exit therefrom, wherein the fluid outlet is arranged within the confinement fluid flow device; providing a second fluid flow device configured to generate a reaction fluid flow for reacting with droplets in the droplet stream, wherein the outlet of the first fluid flow device is arranged within the second fluid flow device;

and configuring the liquid dispenser and the generated confinement fluid flow to achieve a minimum velocity of the confinement fluid flow according the expression:

$$U_{min} \geq 0.2 \cdot \left( \frac{\mu_g^2 H^3}{\rho_g^2 D_1^5} \right)^{1/2}$$

where: $U_{min}$ is the velocity of the flow rate of the confinement fluid; $\mu_g$ is the viscosity of the confinement fluid; H is the distance between the liquid outlet of the liquid dispenser and the outlet of the first fluid flow device; $\rho_g$ is the density of the confinement fluid; and $D_1$ is the external diameter of the liquid dispenser.

Figure 2:
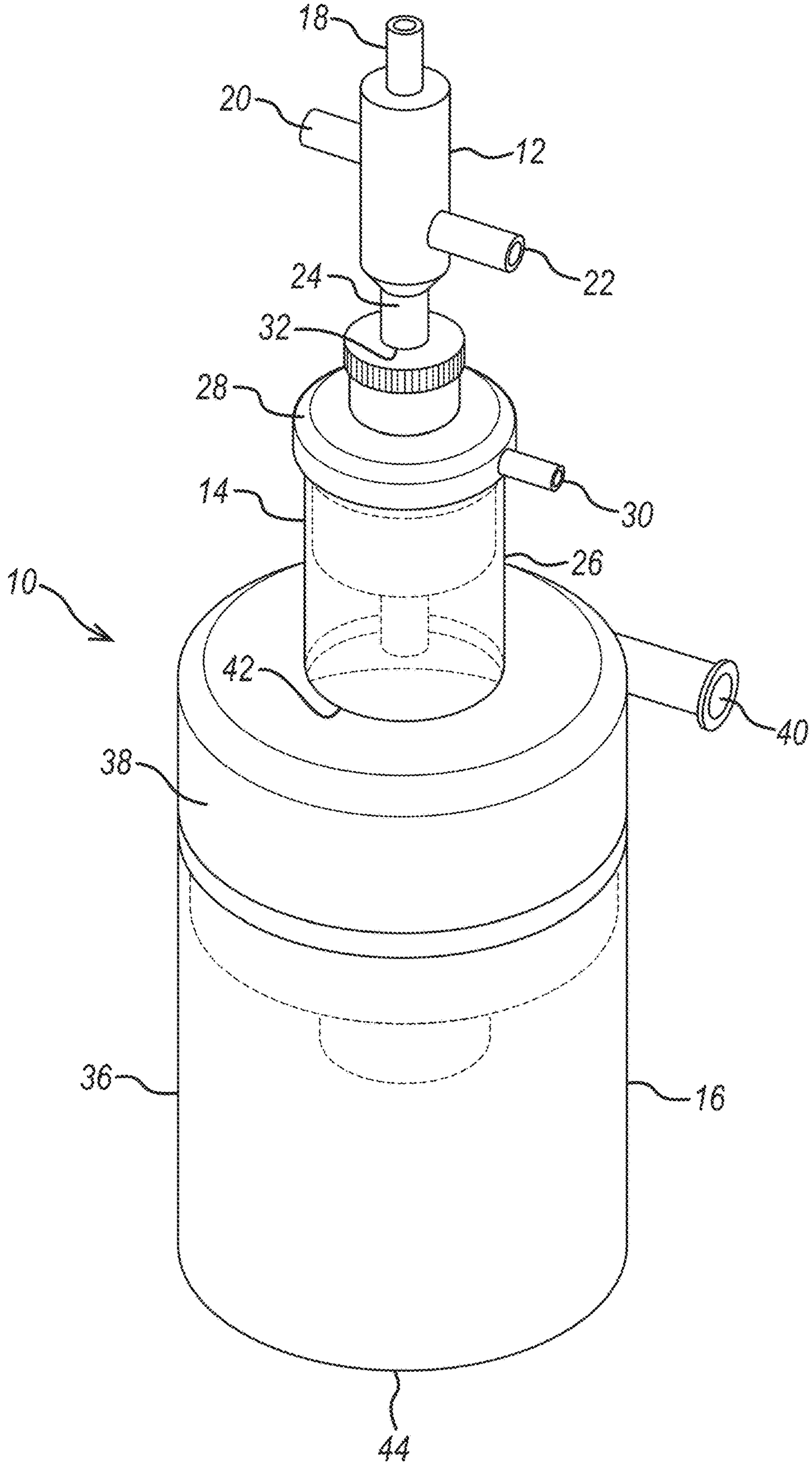
FIG. 2 illustrates an apparatus for spray drying according to a first embodiment of the invention.
Figure 3:
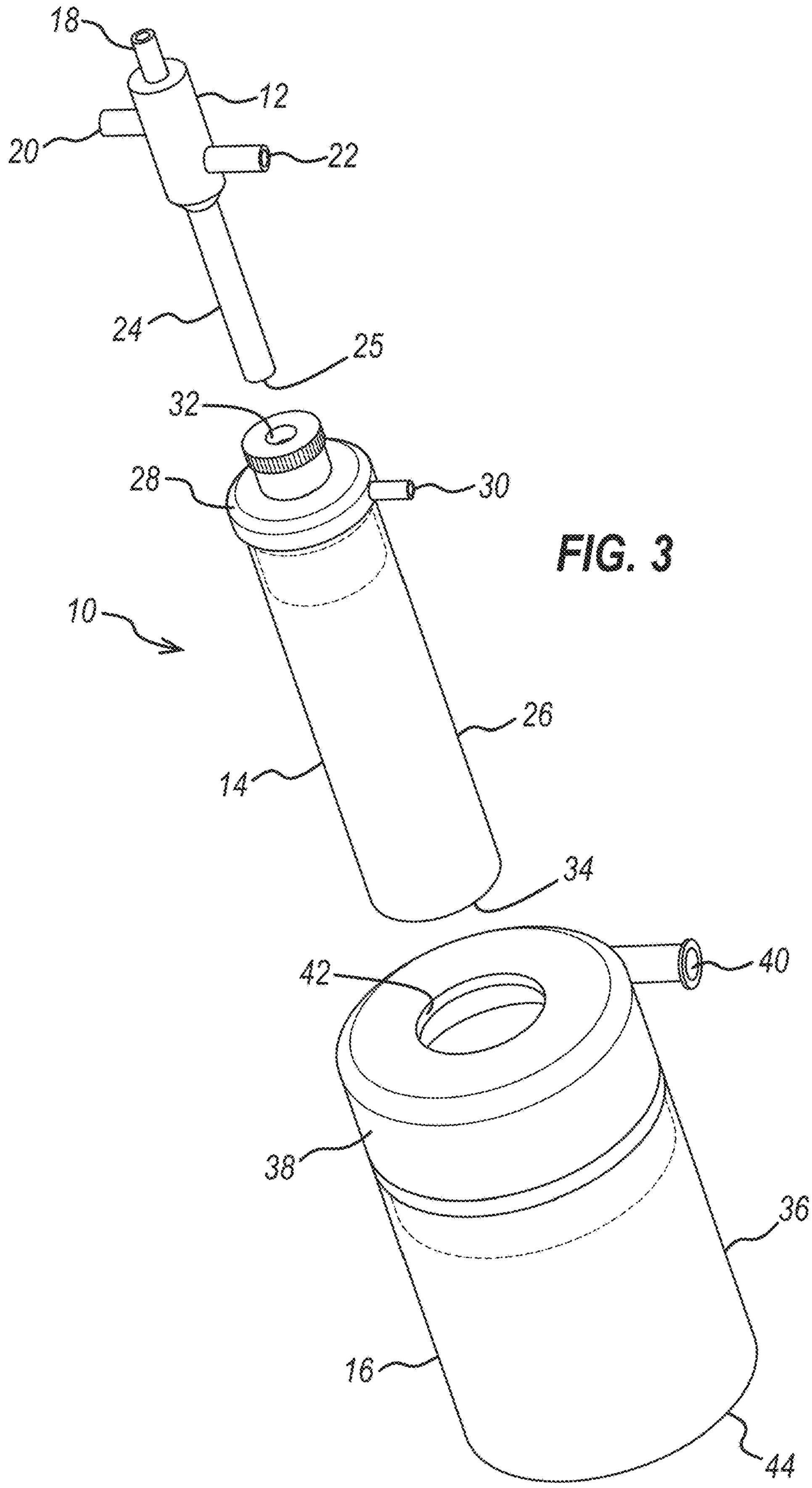
FIG. 3 illustrates an expanded view of the apparatus illustrated in FIG. 2.

FIG. 2 illustrates an apparatus 10 for spray drying. The apparatus 10 can be separated into three main parts; a liquid dispenser or liquid dispensing device 12, a first fluid flow device or confinement/prevention device 14 and a second fluid flow device or reaction/drying device 16. FIG. 3 illustrates the apparatus 10 in an expended view.

FIGS. 2 and 3 are now used to describe the apparatus 10. The liquid dispenser 12 is a form of flow focusing device or nozzle. However, it will be appreciated that a flow focusing nozzle is used here as an example, but other types of nozzle (e.g., vibrating nozzle, ultrasonic nozzle, or ink-jet nozzle) may be used. The operation of the liquid dispenser is described in more detail with reference to FIG. 7. The liquid dispenser 12 includes two fluid inlets 18, 20 for introducing fluids to produce a droplet at a proximate end. For example, the first fluid inlet 18 may be fed with a core-droplet fluid, for example, an oily fragrance, and the second fluid inlet 20 may be fed with a shell-droplet fluid, for example, an aqueous polymeric solution (e.g., Arabic Gum or Shellac). The resultant droplet is in the form of a core-shell or capsule droplet (i.e., a droplet comprising a core and an outer shell). It will be appreciated that the liquid dispenser 12 may only include a single fluid inlet (i.e., one of two fluid inlets 18, 20) for feeding only a single fluid for the production of droplets. Other core or shell fluids include aqueous or organic suspensions, emulsions, organic polymeric solution, aqueous/organic solutions including ingredients, actives, pure liquids or solutions including mixtures of components such as plasticizers, additives, thickeners, and monomers. A third fluid inlet 22 is provided for feeding a carrier fluid such as air. Other gases may be used as a carrier fluid, such as argon or nitrogen. The fluid dispenser includes a circular, elongate conduit or duct 24 having an external diameter of 5 mm which is coupled to each of the fluid inlets 18, 20, 22 and is terminated at a distal end with a nozzle, orifice or outlet 25. The nozzle 25 in this embodiment includes a single outlet orifice having a diameter of 350 μm (not shown). The duct 24 includes one or more internal ducts or conduits which are described in more detail with reference to FIG. 7.

The first fluid flow device or confinement/prevention device 14 includes an elongate circular conduit or duct 26 having an internal diameter of 60 mm. The duct 26 has at its proximal end a cap, lid or cover (i.e., a closure device) 28 used to close the duct 26 at its proximal end except for an opening or inlet 32 to allow the liquid dispenser 12 to be inserted therein. The diameter of the duct 26 is greater than the diameter of the duct 24. The duct 24 of the liquid dispenser 12 is arranged such that at least a portion (i.e., a distal portion) extends through the opening 32 and within the duct 26, and a further portion (i.e., a proximal portion) extends outside of the duct 26. As can be seen in FIG. 2, the nozzle 25 is arranged part way along the length of the duct 26 (i.e., the liquid dispenser is terminated within the duct 26). The liquid dispenser 12 is arranged concentrically within the first fluid flow device 14. The closure device 28 includes an inlet 30 that is coupled to an internal channel (not shown) to allow the passage of fluid from the inlet 30 through the internal channel of the closure device 28. The closure device 28 also includes an opening (not shown) coupled to the internal channel to allow the passage of a fluid into the duct 26. The opening within the closure device 28 may be circular to match the cross sectional shape of the duct 26. The circular duct 26 has an opening, exit or outlet 34 at its distal end to allow for the passage of droplets and the fluid fed to the fluid inlet 30.

The second fluid flow device or reaction device 16 includes an elongate circular conduit or duct 36 having an internal diameter of 147 mm. The duct 36 has at its proximal end a cap, lid or cover (i.e., a closure device) 38 that closes the duct 36 at its proximal end except for an opening or inlet 42 to allow the duct 26 of the first fluid flow device 14 to be inserted therein. The diameter of the duct 36 is greater than the diameter of the duct 26. The duct 26 of the first flow device 14 is arranged such that at least a portion (i.e., a distal portion) extends through the opening 42 and within the duct 36, and a further portion (i.e., a proximal portion) extends outside of the duct 36. As can be seen in FIG. 2, the opening 34 is arranged part way along the length of the duct 36 (i.e., the first fluid flow device 14 is terminated within the duct 36). The first fluid flow device 14 is arranged concentrically within the second fluid flow device 16. The closure device 38 includes an inlet 40 that is coupled to an internal channel (not shown) to allow the passage of fluid from the inlet 40 through the internal channel of the closure device 38.

The closure device 38 also includes an opening (not shown) coupled to the internal channel to allow the passage of a fluid into the duct 36. The opening within the closure device 38 may be circular to match the cross sectional shape of the duct 36. The circular duct 36 has an opening, exit or outlet 44 at its distal end to allow for the passage of droplets and the fluid fed to the fluid inlets 30, 40. Alternatively, fluid may be drawn from the outlet 44 by creating a negative pressure at the outlet 44 using a suitable suction pump.

In this example, the second (reaction) fluid flow device 16 is manufactured from stainless steel (i.e., the closure device 38) and glass (i.e., the elongate conduit 36), and the first (confinement) fluid flow device 14 is manufactured from similar materials. The liquid dispenser 12 is manufactured from plastics and stainless steel. Glass has been used in this example to reduce any large scale fluctuations that could result from any internal roughness on the interior walls of the elongate conduits 26, 36.

Figure 4:
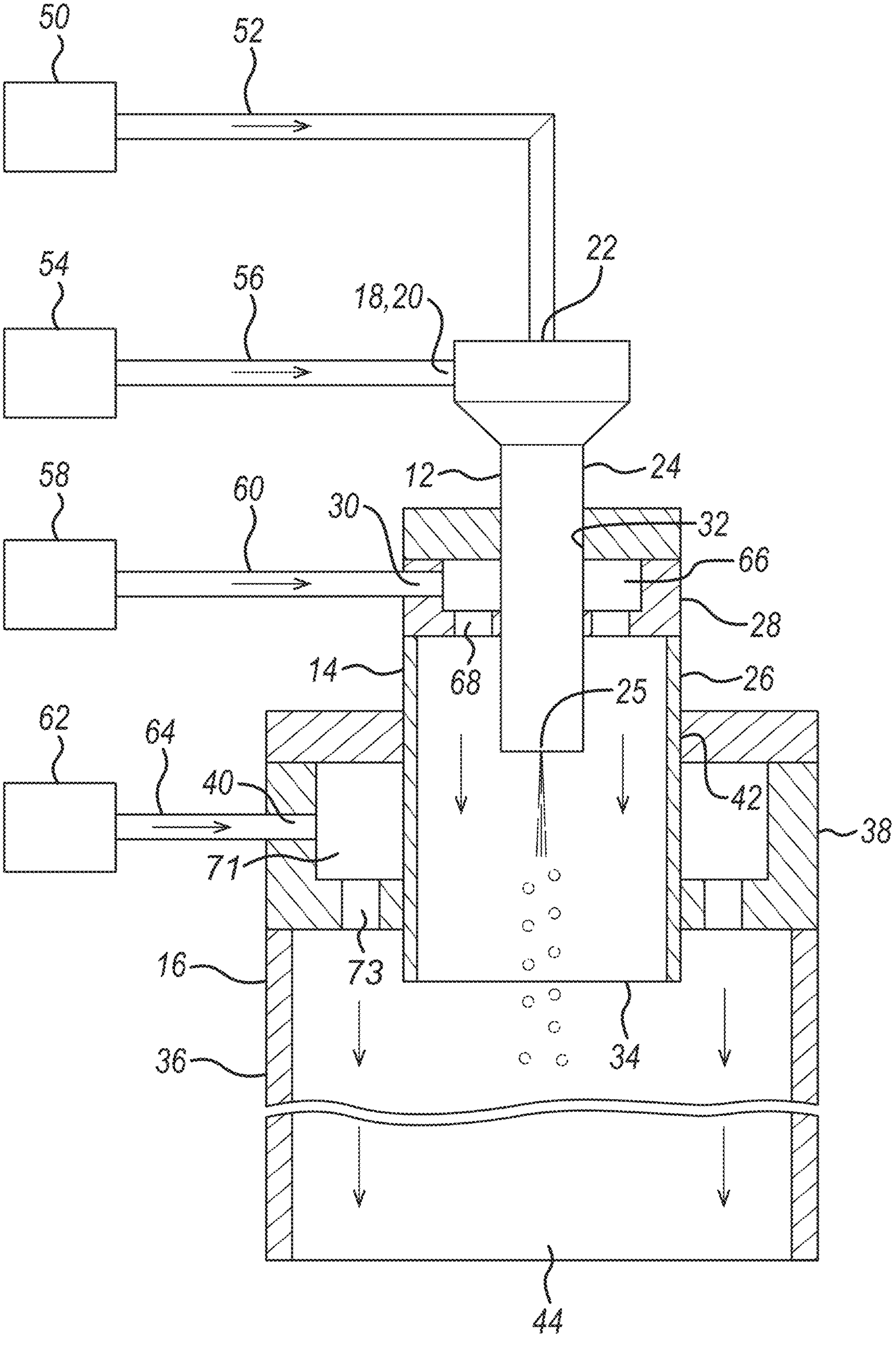
FIG. 4 illustrates schematically a cross-section through an apparatus according to the first embodiment of the invention.

FIG. 4 illustrates schematically a cross-section through the apparatus 10 illustrated in FIG. 2. The same reference numerals are used in FIG. 4 as used in FIGS. 2 and 3 for like features. FIG. 4 illustrates the internal channel 66 of the closure device 28 and its associated circular opening 68. FIG. 4 also illustrates the internal channel 71 of the closure device 38 and its associated circular opening 73.

In operation, the apparatus 10 is coupled to a number of feeding systems, which may include compressors which are configured to pressurize air and feed the pressurized air to various inlets of the apparatus 10. The fluid dispenser 12 is coupled to a compressor 50 via a pipe (line or passage) 52 at its inlet 22. The compressor 50 in this example feeds air to the dispenser 12 so that the air provides a carrier for droplets such that an aerosol is dispensed by the liquid dispense 12. However, a pump (e.g., a pressurized container, micropump, screw pump, or piezoelectric pump) could be used to feed the liquid dispenser 12 with a fluid (e.g., water if an organic solution is used) to form an emulsion. A pump 54 is coupled to the inlets 18, 20 via a pipe (line or passage) 56 to provide a core and shell-droplet material. It will be appreciated that only a single pump 54 is illustrated for simplicity, but when producing core-shell droplets, two separate pumps are used; one for each fluid inlet. Of course, droplets may also be produced using a single liquid such that only a single pump is required. A compressor 58 is coupled to the inlet 30 of the first fluid flow device 14 via a pipe (line or passage) 60 and a compressor 62 is coupled to the inlet 40 of the second fluid flow device 16 via a pipe (line or passage) 64. Although not shown in the figure, a suction pump may also be arranged at the opening 44 of the second fluid flow device 16 to create a negative air pressure at the opening 44. In this example, the compressors 58, 62 feed the apparatus 10 with air, but other gases may be used. For example, the compressor 62 may feed the second fluid flow device 16 with air which has a relative humidity of 60% or greater, for example, to react with the droplets containing cyanoacrylates, for example, exiting from the first fluid flow device 14. Furthermore, the compressor 62 typically feeds air to the apparatus having a temperate that is higher than room temperature (i.e., 20° C. to 26° C.). The compressor includes a heating element which is controlled to increase the temperature of the air flowing through the compressor. In this example, the temperature of reaction fluid is greater than the confinement fluid, which may be used for drying droplets, for example. However, it will be appreciated that the temperatures of the confinement and reaction flow may be different, such that the temperature of the confinement fluid is greater than the reaction fluid, for example. This may be achieved by increasing the temperature of the confinement fluid above room temperature while maintaining the temperature of the reaction fluid at room temperature, or alternatively, cooling the reaction fluid while maintaining the confinement fluid at room temperature. In an alternative configuration where a negative pressure is created at the outlet 44, the element labelled 62 in the figure could be replaced with a heating or cooling device only that allows fluid (e.g., air) to be drawn there through and in to the second fluid flow device 16 via inlet 40.

During use, the liquid dispenser 12 is operated and produces a collimated stream of droplets. In this example, the liquid dispenser 12 produces a single stream of droplets. The nozzle 25 dispenses droplets within the conduit 26 of the first fluid flow device 14, whereby a movement of air (or a flow/stream of air) produced using pump 58 creates a preventative air flow that permits the droplet stream to move generally along a trajectory that prevents the droplets from interacting (i.e., adhering) to an interior surface of the conduit 26 of the first fluid flow device 14. The stream of air also permits the droplets to stabilize after exiting the dispenser. The droplet stream exits the opening 34 of the first fluid flow device 14, and enters the conduit 36 of the second fluid flow device 16 and continues to move along a similar trajectory within the flow of air that is provided by the first fluid flow device 14 and the second fluid flow device 16, whereby a movement of air (or a flow/stream of air) produced using pump 62 creates a reaction air flow/stream that reacts with the droplets. In this example, the reaction air flow is an air flow at a temperature that is greater than room temperature which dries the droplets to form of powder. The first and second air streams will mix via diffusion, for example, such that the combined airstream will dry the droplets to form particles/capsules, or collectively a powder, which are collected at the opening 44. For example, the powder may be collected using different types of reservoirs, cyclones, and/or filters.

Two specific examples are now described using the apparatus 10 described in association with FIGS. 2, 3 and 4.

In example one, a solution of Shellac (15% w/v) is dispensed from a single nozzle of the fluid dispenser 12 at a volume flow rate of 30 mL/h (i.e., $8.333*10^{-9}$ $m^3/s$) using pump 54, and a carrier phase is introduced at a pressure of 90 mbar using compressor 50. The velocity of the droplets exciting the fluid dispenser 12 is 100 m/s and the droplets have a diameter of 80 μm (+/−5 μm). The air flow from the second fluid flow device 16, produced by compressor 62, is at a volume flow rate of 320 L/min (i.e., 0.0053 $m^3/s$) at a temperature of 78.5° C., which equates to a Reynolds number of 2,182 (i.e., the flow is laminar). The air flow from the first or preventing fluid flow device 14, produced by compressor 58, is at a volume flow rate of 60 L/min (i.e., 0.001 $m^3/s$) at room temperature, which equates to a Reynolds number of 1,150 (i.e., the flow is laminar). In example one, the nozzle 25 of the fluid dispenser 12 is terminated at a distance of 10 mm from the opening or fluid exit 34 of the first fluid flow device 14. The apparatus 10 is operated according to example one, produced dried particles with a yield of 90%. It is noted that particles are produced, since only a single liquid was dispensed from the liquid dispenser 12.

In example two, a solution of Shellac (10% w/v) is dispensed from a single concentric nozzle of the fluid dispenser 12 at a volume flow rate of 30 mL/h (i.e., approximately $8.333*10^{-9}$ $m^3/s$) using pump 54, and a carrier phase is introduce at a pressure of 90 mbar using compressor 50. In example two, the Shellac is a shell liquid and water is dispensed as a core liquid at a volume flow rate of 1 mL/h (i.e., approximately $2.77*10^{-10}$ $m^3/s$). The velocity of the droplets exciting the fluid dispenser 12 is 100 m/s and the droplets have a diameter of 80 μm (+/−5 μm). The air flow from the second fluid flow device 16, produced by compressor 62, is at a volume flow rate of 80 L/min (i.e., approximately 0.0013 $m^3/s$) at a temperature of 70° C. to 75° C., which equates to a Reynolds number of 1,982 (i.e., the flow is laminar). The air flow from the first or preventing fluid flow device 14, produced by compressor 58, is at a volume flow rate of 8 L/min (i.e., approximately 0.00013 $m^3/s$) at room temperature, which equates to a Reynolds number of 543 (i.e., the flow is laminar). In example two, the nozzle 25 of the fluid dispenser 12 is terminated at a distance of 10 mm from the opening 34 of the first fluid flow device 14. That is to say that the distance travelled by the dispensed droplets is 10 mm within the first fluid flow device 14. During operation, the apparatus 10, operated according to example two, produced dried, monodispersed particles. It will be understood that as the fluid in the core is just water in this example, the water is evaporated and dried. Therefore, nothing is retained in the core and the final dried droplet is like a particle without a core. This is in contrast to a capsule which includes a core material.

The applicant has determined that the velocity of the confinement fluid in apparatus 10 such that at least 99.5% of the droplets produced using the liquid dispenser 12 are recoverable and are able to pass to the second, reaction fluid flow device 16, (0.5% of the droplets either adhere to the internal walls of the first fluid flow device 14 or become agglomerated, for example) is expressed according to the following formula:

$$U_{min} \geq k\left(\frac{\mu_g^2 H^3}{\rho_g^2 D_1^5}\right)^{1/2}$$

where $U_{min}$ is the velocity of the confinement fluid, k is a constant in the range of 0.2 to 2.0, and includes 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0 at least, $\mu_g$ is the viscosity of the fluid fed by compressor 58 (i.e., the viscosity of the confinement fluid), H is the distance between a liquid outlet or nozzle 25 of the liquid dispenser 12 and a fluid exit 34 of the first fluid flow device 14, $\rho_g$ is the density of the confinement fluid, and $D_1$ is the external diameter of the liquid dispenser 12.

Moreover, to achieve laminar flow in the first, confinement, fluid flow device 14, Reynolds number should be less than $4\cdot 10^3$, where Reynolds number is provided by the following known expression:

$$4\cdot 10^3 \geq \frac{\rho_g U D_3}{\mu_g}$$

where U is the velocity of the confinement fluid and $D_3$ is the internal diameter of the first fluid flow device. Accordingly, the velocity of the confinement fluid can be determined within the range of:

$$4\cdot 10^3 \geq \frac{\mu_g}{\rho_g D_3} \geq U \geq k\left(\frac{\mu_g^2 H^3}{\rho_g^2 D_1^5}\right)^{1/2}$$

In practical terms, the cross section of the protection device (i.e., the first fluid flow device) may be chosen/designed to obtain the required velocity using an air flow rate as low as possible while considering the confinement air is cold and will cool the hot drying air, which may decrease its drying capacity and avoiding droplet interaction with the internal walls of the protection device in order to achieve less than 0.5% losses.

Figure 5:
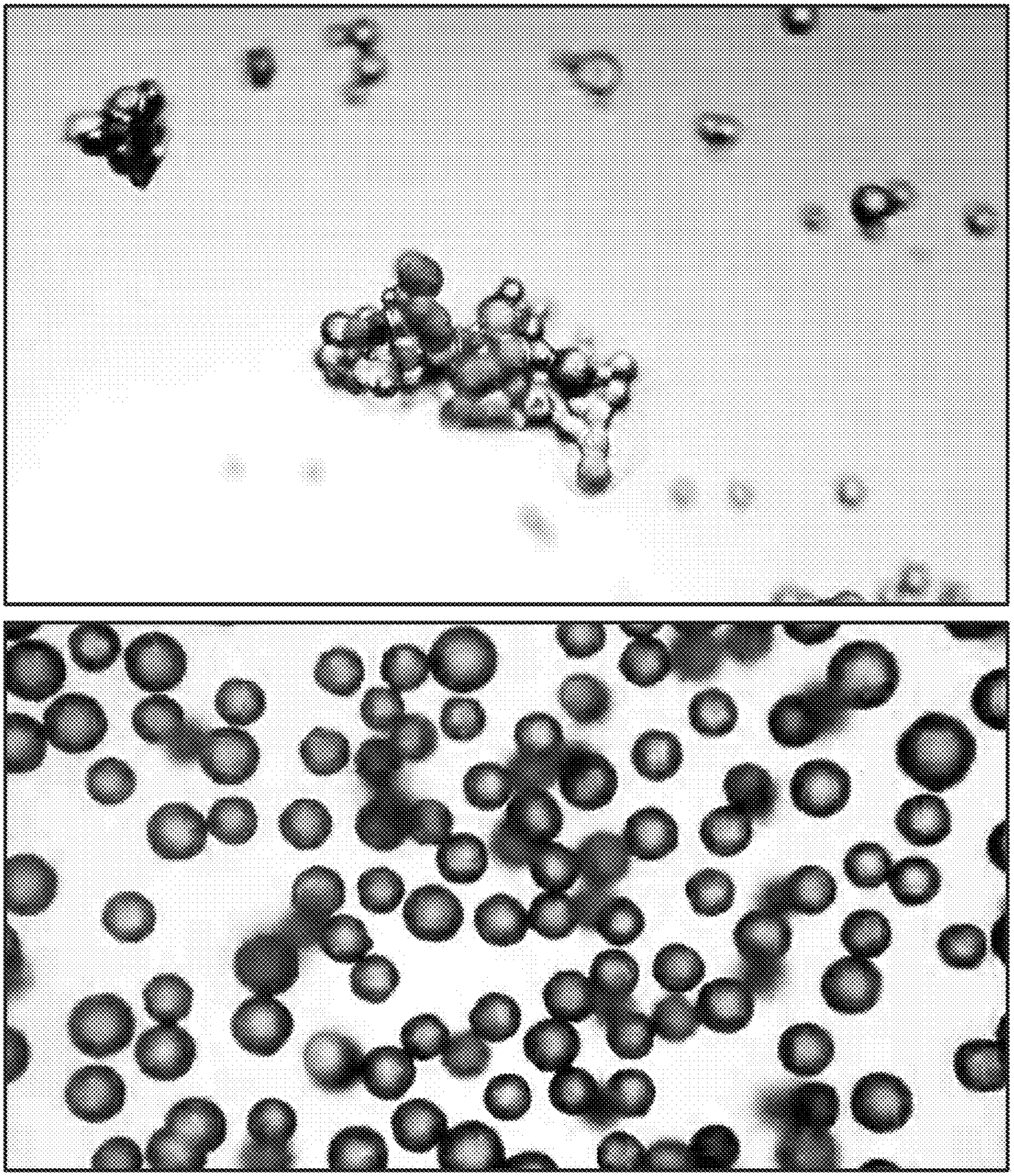
FIG. 5 illustrates, in an upper image, polydispersed, agglomerated droplets, and, in a lower image, monodispersed, dried droplets.

FIG. 5 illustrates two images of droplets. In the upper image, polydispersed, agglomerated droplets are illustrated that may be produced using the known system illustrated in FIG. 1, for example. The droplets may have become agglomerated shortly after leaving the fluid dispenser 2. In the lower image, dried, monodispersed particles are illustrated, which are formed from core-shell droplets dispensed according to example two described above.

Figure 6:
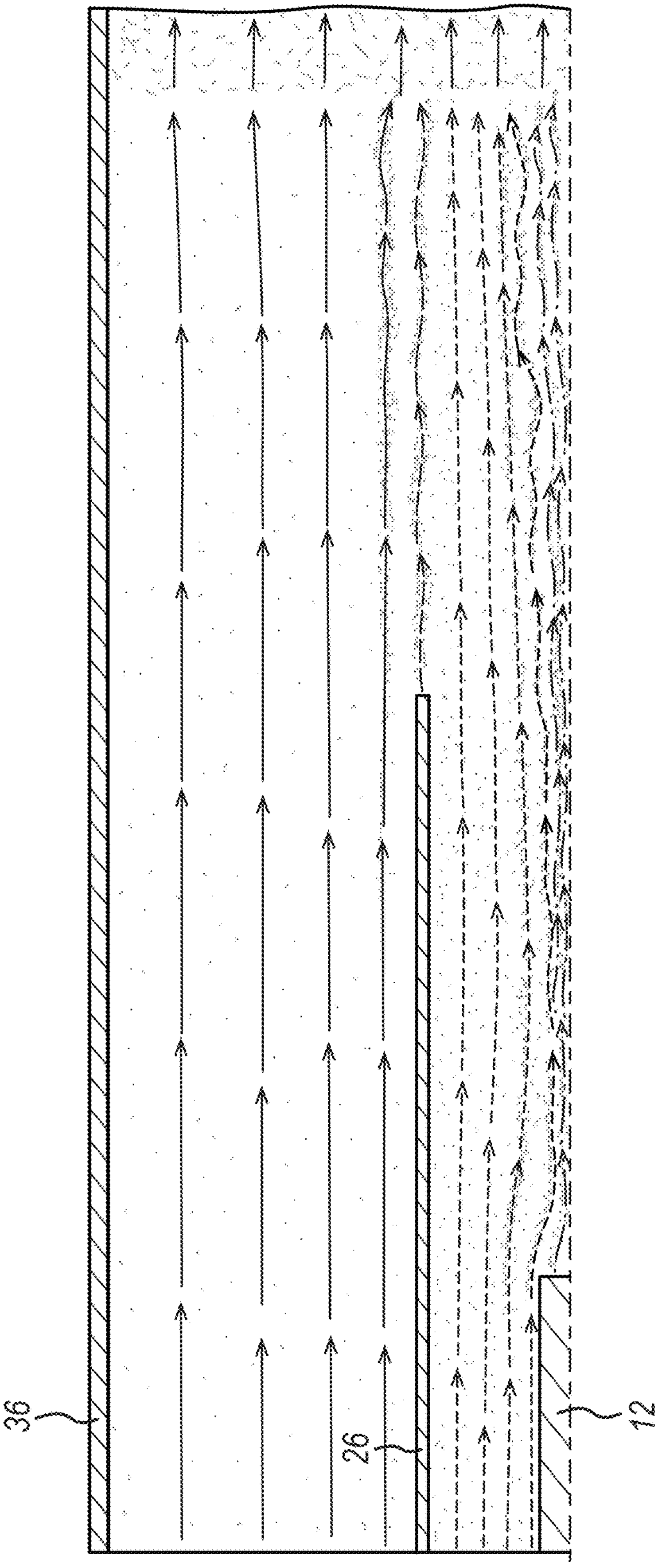
FIG. 6 illustrates a partial cross-section through the apparatus according to the first embodiment of the invention.

FIG. 6 illustrates a partial cross-section through the apparatus illustrated in FIGS. 2, 3 and 4. In particular, a cross-section through the elongate conduit 36 of the second fluid flow device 16, the elongate conduit 26 of the first fluid flow device 14 and the fluid dispenser 12. The figure illustrates schematically the fluid flow from each of the devices and how it interacts. As can be seen from the figure, the fluid exiting the fluid dispenser 12 is travelling at a different velocity to the fluid flow from the first fluid flow device 14, such that there may be sheering where the two fluids meet, which may cause local turbulence. However, the first fluid flow device 14 is dimensioned so as to prevent any disturbance to the droplet stream exiting the fluid dispenser 12. Similarly, the fluid exiting the first fluid device 14 is typically travelling at a difference velocity to the fluid flow exiting from the second fluid flow device 16, such that there may be sheering forces where the two fluids meet, which may cause local turbulence. Any disturbance between the first and second (i.e., the confinement and reaction) fluid flows is less significant than any disturbance between the droplets exiting the fluid dispense 2 and the first fluid flow, since once the droplets have exited from the first fluid flow and into the second fluid flow, they are already typically stabilized. Once the first (confinement) fluid flow has exited the first flow device 14 into the second (reaction) fluid flow, the two fluids will gradually mix by diffusion as the fluids flow from the left to the right in the orientation shown in the figure, such that the increased temperature of the second fluid flow will effectively increase the temperature of the first fluid flow and dry the droplets to form a powder.

Figure 7:
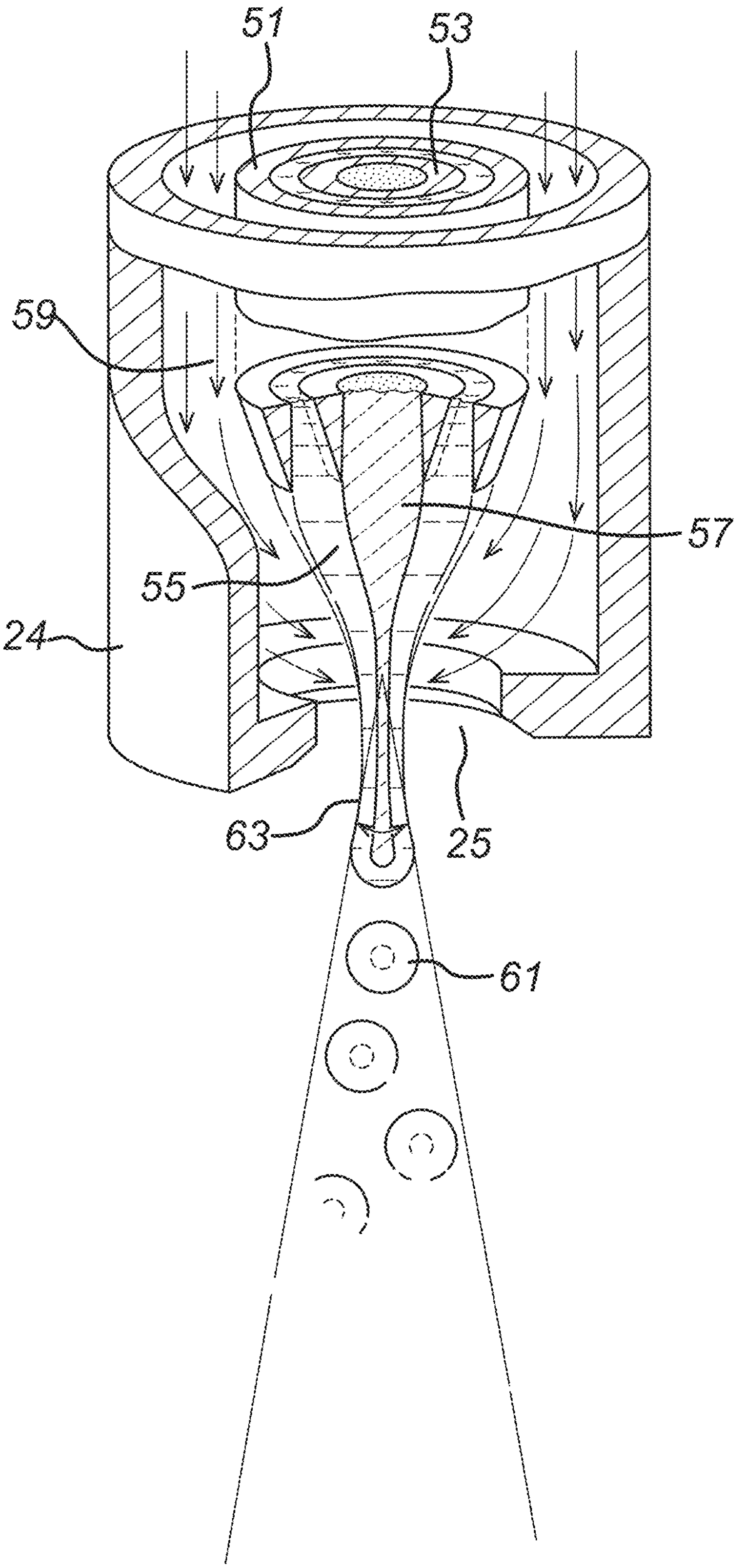
FIG. 7 illustrates a cross-section through a flow focusing nozzle according to the first embodiment of the invention.

FIG. 7 illustrates a cross-section through a flow focusing nozzle according to a second embodiment of the invention. The nozzle illustrated in FIG. 7 forms the distal end of the liquid dispenser 12 illustrated in FIGS. 2 and 3. In this regard the duct 24 forms the outer channel or conduit of the nozzle. The nozzle is concentrically arranged and includes a first inner channel or fluid passage 51 (i.e., an outer fluid dispenser) arranged concentrically within the duct 24 and a second inner channel or fluid passage 53 (i.e., an inner fluid dispenser) arranged concentrically within the first inner channel 51. Although not illustrated in FIG. 7, the channel or duct formed between the duct 24 and the first inner channel 51 is coupled to the fluid inlet 22 illustrated in FIGS. 2, 3 and 4 for feeding a carrier fluid 59, the channel or duct formed between the first inner channel 51 and the second inner channel 53 is coupled to the second fluid inlet 20 illustrated in FIGS. 2, 3 and 4 for feeding a shell-droplet fluid 55, and the second inner channel 53 is coupled to the first fluid inlet 18 illustrated in FIGS. 2, 3 and 4 for feeding a core-droplet fluid 57. Each of the first and second inner ducts 51, 53 are terminated within the duct 24 such that fluid exiting from these inner ducts interacts with the carrier fluid 59 within duct 24. The nozzle, orifice or outlet 25 allows the passage of the combined core-shell fluid 57, 55 and the carrier fluid 59 out of the device first as a stream, which subsequently forms droplets 61. It will be appreciated that the first inner wall 51 is optional, and is not typically used if a single fluid is used to generate the droplets (i.e., the generated droplets are not core-shell type droplets). Each of the fluids 55, 57, 59 illustrated in FIG. 7 may be a gas or a liquid.

During operation, fluid is fed to each of the fluid inlets and travels along each respective duct to the orifice 25. As the fluids 55, 57 exit the first and second inner ducts 51, 53 they do not typically mix, such that the first fluid 55 forms an outer shell to the second fluid 57. The carrier fluid 59 accelerates the first and second fluids 55, 57 to generate a monodispersed beam of droplets.

The applicant has determined that a collimated stream of droplets having a geometric standard deviation of the disbursement of droplets from the collimated stream of droplets (i.e., a measure of the spread of droplets with respect to the droplet stream) of less than 1.6 can be achieved with a nozzle configured to according to the expression:

$$\left(\frac{D^2\Delta P^2\rho_l^2 Q_l}{\sigma\mu_l^3}\right)^{1/4} \leq \frac{1+0.5\left(\frac{\rho_l}{\rho_d}\right)}{1+0.018\left(\frac{\mu_l}{\mu_d}\right)}$$

where D is the nominal diameter of the discharge orifice (i.e., orifice 25), AP is the pressure of the carrier fluid, $\rho_l$ is the density of the fluid being dispensed, $Q_l$ is the flow rate of the fluid being dispensed from the first fluid dispensing device, $\sigma$ is the surface tension between the fluid being dispensed and the carrier fluid, $\rho_d$ is the density of the carrier fluid, and $\mu_d$ is the viscosity of the carrier fluid. In the nozzle illustrated in FIG. 7, two fluids are used to form a core-shell type droplet. In this case, the density of the fluid being dispensed ($\rho_l$) is taken to be the greatest density of the two fluids being dispensed. In the nozzle illustrated in FIG. 7, two fluids 55, 57 are dispensed to form core-shell droplets, such that the density and viscosity values (i.e., $\rho_d$ and $\mu_d$) are typically of the dispensed fluid with the greatest fluid velocity, which is typically the shell forming fluid 55.

Preferably, a geometric standard deviation of the disbursement of droplets from the collimated stream of droplets of less than 1.4, and more preferably less than 1.3 can be achieved using a nozzle configured according to the above-expression. The angle of the fluid dispensed from a nozzle (angle 63 illustrated in FIG. 7) is preferably less than or equal to 5 degrees.

Figure 8:
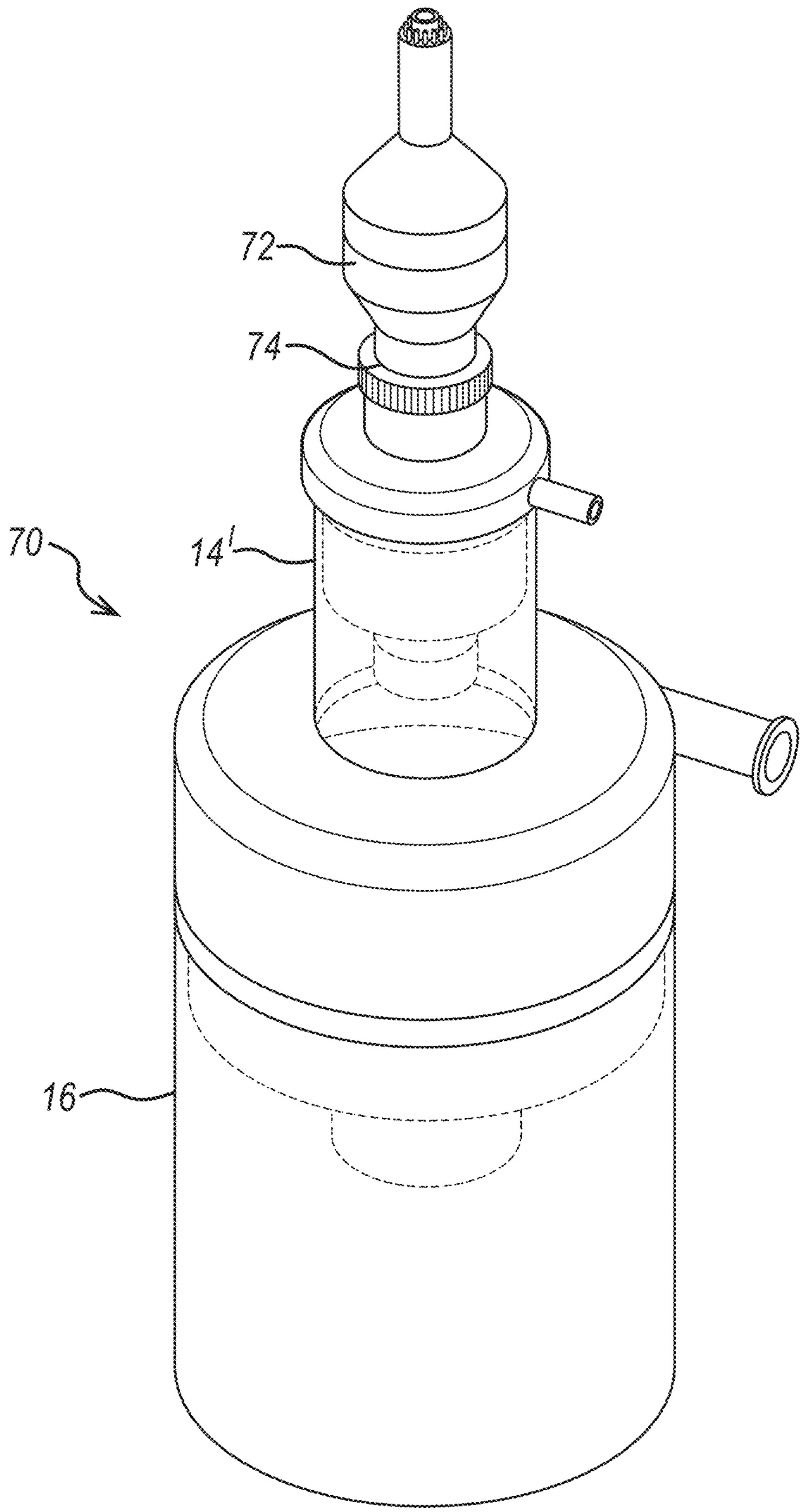
FIG. 8 illustrates an apparatus for spray drying according to a second embodiment of the invention.

FIG. 8 illustrates an apparatus 70 for spray drying according to a second embodiment of the invention. Apparatus 70 is similar to apparatus 10 in that it includes the same second flow device 16. Apparatus 70 also includes a similar first fluid flow device 14' to that described in association with apparatus 10, except the opening 74 of the first fluid flow device 14' is greater than the opening 32 of the first fluid flow device 14 to accommodate a larger fluid dispensing device or fluid dispenser 72. The fluid dispensing device 72 is larger in diameter than the fluid dispenser 12, since it includes multiple nozzles to produce multiple droplet streams, as is described in association with FIG. 10. The apparatus 70 is operated in the same manner as apparatus 10, except for the fluid dispenser 72, which is described in association with FIG. 10.

The apparatus 70 illustrated in FIG. 8 includes a multi-nozzle dispensing device 72. Using the expression for a single nozzle dispensing device presented above, it is possible to predict the velocity of the confinement fluid required in a multi-nozzle dispensing device to recover at least 99.5% of the droplets produced using the multi-nozzle dispensing device. This is done by replacing the value of H in the previously presented expression with the expression H/(1-$D_2/D_3$), where H is the distance between a liquid outlet or nozzle of the liquid dispenser 72 and a fluid exit of the first fluid flow device 14', $D_2$ is the smallest diameter of a virtual circle containing the centres of the discharge orifices/exits of the nozzles in the multi-nozzle dispensing device 72 and $D_3$ is the internal diameter of the first fluid flow device 14'. The following expression is obtained:

$$U_{min} \geq k\left(\frac{\mu_g^2 H^3}{\rho_g^2 D_1^5 (1 - D_2/D_3)^3}\right)^{1/2}$$

where $U_{min}$ is the velocity of the confinement fluid, k is a constant in the range of 0.2 to 2.0 and includes 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0 at least, $\mu_g$ is the viscosity of the confinement fluid, H is the distance between a liquid outlet or nozzle of the multi-nozzle dispensing device 72 and a fluid exit of the first fluid flow device 14', $\rho_g$ is the density of the confinement fluid, $D_1$ is the external diameter of the multi-nozzle liquid dispenser 72, $D_2$ is the smallest diameter of a virtual circle containing the centres of the discharge orifices/exits of the nozzles in the multi-nozzle dispensing device 72 and $D_3$ is the internal diameter of the first fluid flow device 14'.

A specific example is now described using the apparatus 70 described in association with FIG. 8.

In example three, a solution of Arabic Gum (10% w/v) is dispensed from a multiple nozzle including 8 nozzles of the fluid dispenser 72 at a volume flow rate of 30 mL/h per nozzle (i.e., approximately $8.333 \times 10^{-9}$ $m^3/s$), and a carrier phase is introduce at a pressure of 85 mbar. The droplets have a diameter of 82 μm (+/−5 μm). The air flow from the second fluid flow device 16 is at a volume flow rate of 550 L/min (i.e., approximately 0.0092 $m^3/s$) at a temperature of 70° C. to 75° C., which equates to a Reynolds number of 4,330 (i.e., the flow is NOT laminar). The air flow from the first or preventing fluid flow device 14' is at a volume flow rate of 50 L/min (i.e., approximately 0.00083 $m^3/s$) at room temperature, which equates to a Reynolds number of 982 (i.e., the flow is laminar). In example three, the nozzles 25 of the fluid dispenser 72 are terminated at a distance of 10 mm from the opening of the first fluid flow device 14'. That is to say that the distance travelled by the dispensed droplets is 10 mm within the first fluid flow device 14'. The first fluid device 14' has a diameter of 60 mm. During operation, the apparatus 70, operated according to example three, produced dried, monodispersed particles.

Figure 9:
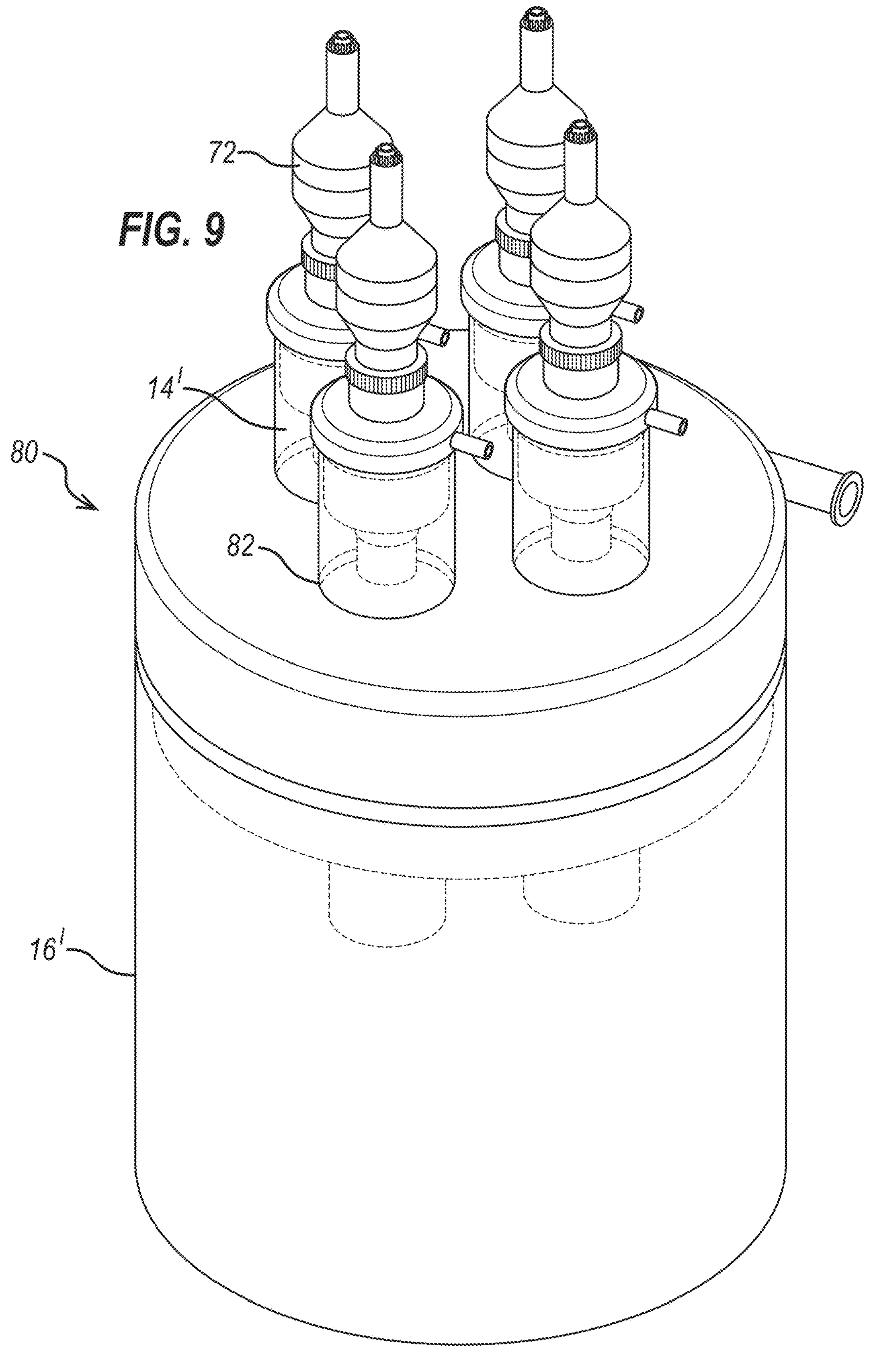
FIG. 9 illustrates an apparatus for spray drying according to a third embodiment of the invention.

FIG. 9 illustrates an apparatus 80 for spray drying according to a third embodiment of the invention. Apparatus 80 is similar to apparatus 70 and includes four fluid flow devices 14', each having a fluid dispenser 72. The second fluid flow device 16' is also similar to the second fluid flow device 16 of apparatus 10, but as can be seen it is greater in diameter and includes four openings 82 to accommodate the four fluid flow devices 14'. The fluid dispensing device 72 is described in association with FIG. 10. The apparatus 80 is operated in the same manner as apparatus 70.

Figure 10:
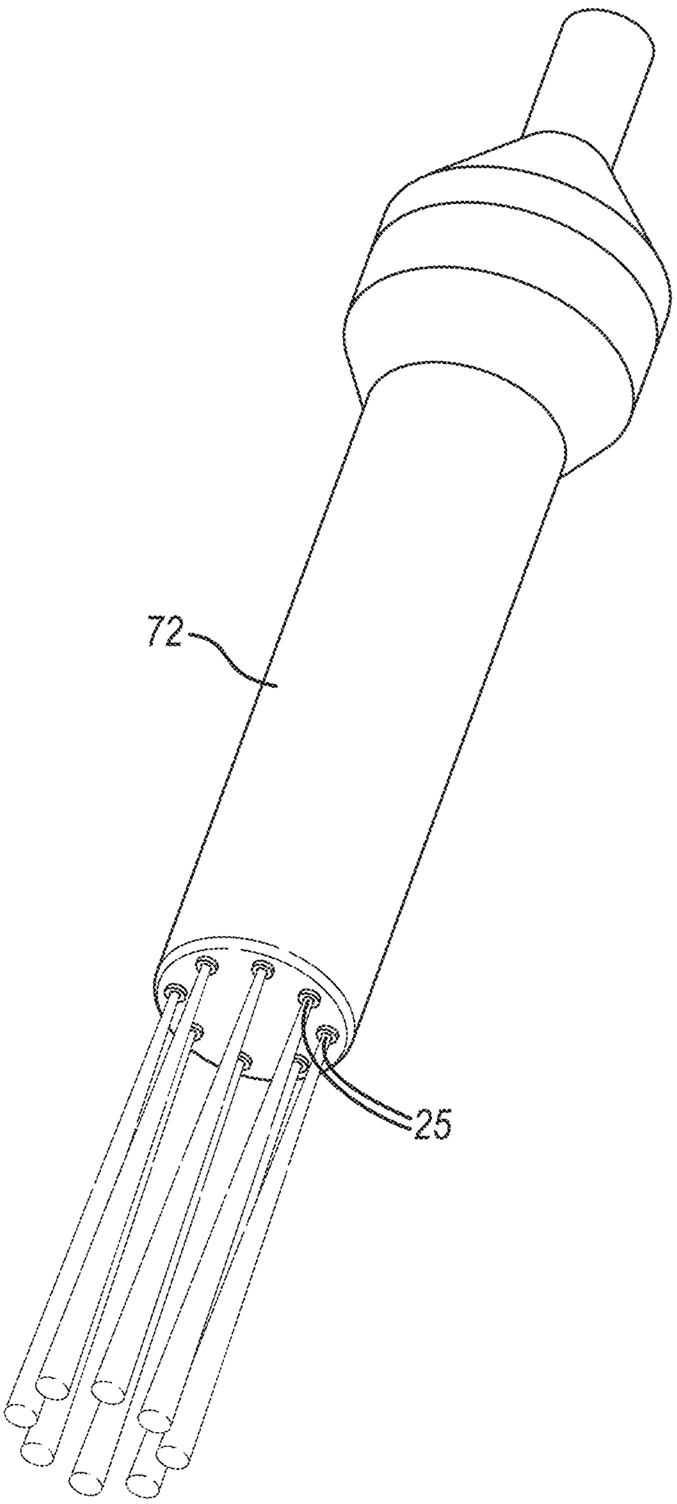
FIG. 10 illustrates a multi-nozzle fluid dispenser which may be used with the second and third embodiments of the invention.

FIG. 10 illustrates a multi-nozzle fluid dispenser 72 which may be used with the second and third embodiments of the invention. The multi-nozzle fluid dispenser 72 includes 8 nozzles 25 in this example. Each of the nozzles 25 includes an associated duct 24, first inner channel 51, and second inner channel 53, as is illustrated in FIG. 7. These are not illustrated in FIG. 10 for simplicity. Each of the ducts for each nozzle is also coupled to an associated compressor or pump. It will be appreciated that the same compressor/pump may feed all of the respective ducts 24, first inner channels 51, and second inner channels 53 depending on the type of droplets being formed.

It will be appreciated that the dimensions provided for the apparatus described herein are only examples and should not be considered to limit the scope of the invention. In this regard, the outer diameter of the fluid dispenser may range from 5 to 100 mm. Furthermore, the internal diameter of the first fluid flow device may range from 5.5 mm to 1000 mm and the internal diameter of the second fluid flow device may range from 50 mm to 2000. Moreover, the ratio between the outer diameter of the fluid dispenser and the internal diameter of the first fluid flow device is from 1:1.1 to 1:100. It is noted that the values for density and viscosity mentioned herein are with respect to room temperature (i.e., 20° C. to 26° C.). The viscosity mentioned herein is a dynamic viscosity, and the density and viscosity values mentioned herein have been determined using the standard test method for dynamic viscosity and density of liquids by Stabinger Viscometer, for example, in accordance with the ASTM standards.

The examples are typically illustrated in a vertical orientation such that the droplets are introduced at the top and exit at the bottom of the apparatus. This is the typical orientation of the apparatus during use.

In the examples described herein, the confinement flow device is a single elongate conduit. However, this can be increased to include multiple elongate conduits arranged concentrically. The multiple elongate conduits will also have different lengths, such that the shortest conduit will terminate within the next longest conduit and so forth. Thus, a nested, or telescopic, confinement device is achieved.

The invention claimed is:

1. An apparatus for generating droplets, comprising:

a liquid dispenser comprising a liquid outlet adapted to generate a collimated droplet stream;

a first fluid flow device configured to generate a confinement fluid flow for confining a trajectory of the droplet stream therein, the first fluid flow device comprises an outlet arranged to allow the droplet stream to exit therefrom, and further comprising a first conduit wherein the liquid outlet is arranged so as to dispense the droplets within the first conduit of the first fluid flow device; and a second fluid flow device configured to generate a reaction fluid flow for reacting with droplets in the droplet stream, the second fluid flow device comprising a second conduit, wherein the first fluid flow device is arranged within the second fluid flow device so that the droplet stream exists in the second conduit of the second fluid flow device.

2. The apparatus of claim 1, wherein the liquid dispenser is concentrically arranged within the first fluid flow device, and/or the first fluid flow device is concentrically arranged within the second fluid flow device.

3. The apparatus of claim 1, wherein each of the confinement fluid and/or the reaction fluid is air.

4. The apparatus of claim 1, wherein the first and/or second fluid flow devices comprise an elongate conduit, and the elongate conduit are circular.

5. The apparatus of claim 1, wherein the liquid outlet comprises a plurality of nozzles, each configured to generate a droplet stream.

6. The apparatus of claim 1, wherein the temperature of the second fluid flow is greater than the temperature of the droplet stream and/or the confinement fluid flow.

7. The apparatus of claim 1, wherein the reaction comprises hardening the droplets in the droplet stream.

8. The apparatus of claim 1, wherein the liquid dispenser is configured to generate the droplet stream using flow focusing.

9. The apparatus of claim 1, wherein the first fluid flow device is dimensioned to produce a laminar fluid flow.

10. A system comprising the apparatus of claim 1 and a first fluid flow generating device coupled to the first fluid flow device and configured to provide the confinement fluid to the first fluid flow device.

11. The system of claim 10, wherein the first fluid flow generating device and the first fluid flow device are configured according to the following expression:

$$U_{min} \geq 0.2 \cdot \left( \frac{\mu_g^2 H^3}{\rho_g^2 D_1^5} \right)^{1/2}$$

where: $U_{min}$ is the velocity of the flow rate of the confinement fluid;
$\mu_g$ is the viscosity of the confinement fluid;
His the distance between the liquid outlet of the liquid dispenser and the outlet of the first fluid flow device;
$\rho_g$ is the density of the confinement fluid; and
$D_1$ is the external diameter of the liquid dispenser.

12. A method comprising:
generating a droplet stream from a liquid dispenser comprising a liquid outlet adapted to generate a collimated droplet stream;
generating a confinement fluid flow within a first fluid flow device to confine the trajectory of the droplet stream, wherein the droplet stream is generated within the confinement fluid flow and exits from an outlet of the first fluid flow device, wherein the liquid outlet is arranged so as to dispense the droplets within a first conduit of the first fluid flow device; and
generating a reaction fluid flow within a second fluid flow device for reacting with droplets in the droplet stream, wherein the confinement fluid flow is generated within the reaction fluid flow, and wherein the droplet stream exits a second conduit of the second fluid flow device.

13. The method of claim 12, wherein the reaction fluid flow hardens the droplets to form particles and the method comprises collecting the particles at an outlet of the second fluid flow device.

14. The method of claim 12, wherein a minimum velocity of the confinement fluid flow is represented by the expression:

$$U_{min} \geq 0.2 \cdot \left( \frac{\mu_g^2 H^3}{\rho_g^2 D_1^5} \right)^{1/2}$$

where: $U_{min}$ is the velocity of the flow rate of the confinement fluid;
$\mu_g$ is the viscosity of the confinement fluid;
H is the distance between the liquid outlet of the liquid dispenser and the outlet of the first fluid flow device;
$\rho_g$ is the density of the confinement fluid; and
$D_1$ is the external diameter of the liquid dispenser.

15. A method of generating a collimated stream of droplets from a flow focusing nozzle comprising a discharge orifice, a first fluid dispenser comprising a liquid outlet adapted to generate the collimated stream of droplets, wherein the liquid outlet is arranged so as to dispense the collimated stream of droplets within a first conduit of the first fluid dispenser, and a second fluid dispenser, wherein the stream of droplets exits a second conduit of the second fluid dispenser, and wherein the second fluid dispenser is arranged to accelerate, with a carrier fluid, a fluid being dispensed from the first fluid dispenser out of the discharge nozzle, the method comprising configuring the flow focusing nozzle to obtain a geometric standard deviation of the disbursement of droplets from the collimated stream of droplets of less than 1.6 according to the expression:

$$\left( \frac{D^2 \Delta P^2 \rho_l^2 Q_l}{\sigma \mu_l^3} \right)^{1/4} \leq \frac{1 + 0.5\left(\frac{\rho_l}{\rho_d}\right)}{1 + 0.018\left(\frac{\mu_l}{\mu_d}\right)}$$

where D is the nominal diameter of the discharge orifice, AP is the pressure of the carrier, $\rho_l$ is the density of the fluid being dispensed, $Q_l$ is the flow rate of the fluid being dispensed from the first fluid dispenser, $\sigma$ is the surface tension between the fluid being dispensed and the carrier fluid, $\mu_l$ is the viscosity of the fluid being dispensed, $\rho_d$ is the density of the carrier fluid, and $\mu_d$ is the viscosity of the carrier fluid.

16. The method of claim 15, wherein the flow focusing nozzle is configured to obtain a geometric standard deviation of the disbursement of droplets from the collimated stream of droplets of less than 1.4.

17. The method of claim 15, wherein the flow focusing nozzle is configured to obtain a geometric standard deviation of the disbursement of droplets from the collimated stream of droplets of less than 1.3.

18. The method of claim 15, wherein the first fluid dispenser comprises an inner fluid dispenser configured to dispense a core fluid and an outer fluid dispenser configured to dispense a shell fluid and wherein $\rho_l$, $Q_l$, and $\mu_l$ are of the shell fluid.

* * * * *